United States Patent [19]

Hermanson et al.

[11] Patent Number: 5,145,617
[45] Date of Patent: Sep. 8, 1992

[54] METHOD OF PROCESSING SCRAP ROOF-MEMBRANE SHEET MATERIAL COMPRISING A FLEXIBLE SYNTHETIC FABRIC SUBSTRATE ENVELOPED IN A THERMOPLASTIC PLASTIC ENVELOPE

[75] Inventors: Harry Hermanson, Caseville, Mich.; Robert C. Hultz, Toledo, Ohio; David R. Grussing, Bay City, Mich.

[73] Assignee: Duro-Last, Inc., Saginaw, Mich.

[21] Appl. No.: 598,917

[22] Filed: Oct. 15, 1990

[51] Int. Cl.⁵ .............................. B29B 17/00
[52] U.S. Cl. ..................... 264/37; 264/140; 264/DIG. 69; 425/208
[58] Field of Search ............... 264/37, DIG. 69, 349, 264/140, 141, 143; 425/200, 204, 205, 208

[56] References Cited

U.S. PATENT DOCUMENTS

| | | | |
|---|---|---|---|
| 2,433,727 | 12/1947 | Arnold | 264/DIG. 69 |
| 2,558,378 | 6/1951 | Petry | 260/41 |
| 3,027,599 | 4/1962 | Pluhacek et al. | 264/DIG. 69 |
| 3,097,991 | 7/1963 | Miller et al. | 264/349 |
| 3,099,067 | 7/1963 | Merriam et al. | 264/349 |
| 3,382,305 | 5/1968 | Breen | 264/171 |
| 3,531,562 | 9/1970 | Serrano et al. | 264/310 |
| 3,535,408 | 10/1970 | Ronden | 264/53 |
| 3,549,734 | 12/1970 | Yasuda et al. | 264/349 |
| 3,562,373 | 2/1971 | Logrippo | 264/118 |
| 3,751,535 | 8/1973 | Ruoti et al. | 264/DIG. 69 |
| 3,806,562 | 4/1974 | Lamort et al. | 264/37 |
| 3,866,890 | 2/1975 | Tadmor et al. | 264/349 |
| 4,091,967 | 5/1978 | Kinoshita | 264/DIG. 69 |
| 4,105,593 | 8/1978 | Stavrinou | 260/2.3 |
| 4,158,646 | 6/1979 | Benkowski et al. | 264/DIG. 68 |
| 4,222,728 | 9/1980 | Bacher et al. | 264/37 |
| 4,227,870 | 10/1980 | Kim | 425/205 |
| 4,250,222 | 2/1981 | Mavel et al. | 428/285 |
| 4,460,277 | 7/1984 | Schultz et al. | 425/205 |
| 4,546,128 | 10/1985 | Nakajima | 523/222 |
| 4,617,111 | 10/1986 | Grimm et al. | 209/4 |
| 4,726,846 | 2/1988 | Jackson et al. | 521/45.5 |
| 4,894,001 | 1/1990 | Petschner | 425/205 |
| 4,968,463 | 11/1990 | Levasseur | 264/37 |

FOREIGN PATENT DOCUMENTS

| | | |
|---|---|---|
| 2422336 | 11/1974 | Fed. Rep. of Germany ... 264/DIG. 69 |
| 2427070 | 10/1975 | Fed. Rep. of Germany ... 264/DIG. 69 |
| 2615610 | 10/1977 | Fed. Rep. of Germany ... 264/DIG. 69 |
| 253215 | 1/1988 | Fed. Rep. of Germany ... 264/DIG. 69 |

Primary Examiner—David A. Simmons
Assistant Examiner—William J. Matney, Jr.
Attorney, Agent, or Firm—Learman & McCulloch

[57] ABSTRACT

A method of processing scrap, single-ply synthetic plastic roof-membrane sheet material comprising a fabric, having warp and weft strands composed of bundles of synthetic plastic fibers, encased in a thermoplastic synthetic plastic envelope. Comminuted pieces of the scrap are stuffed into a heat-applying, continuous mixer-extruder having screw mechanism within an elongate barrel chamber and the compressed material then is heated to plasticizing temperature and subjected to repetitive shear forces as it moves along the barrel chamber to a die discharge. The warp strands are separated from the weft strands via said shear force application and disembodied via said shear forces to provide discrete fibers in the mix of material. Finally, the fibers are randomly dispersed in the mix material and extruded.

19 Claims, 3 Drawing Sheets

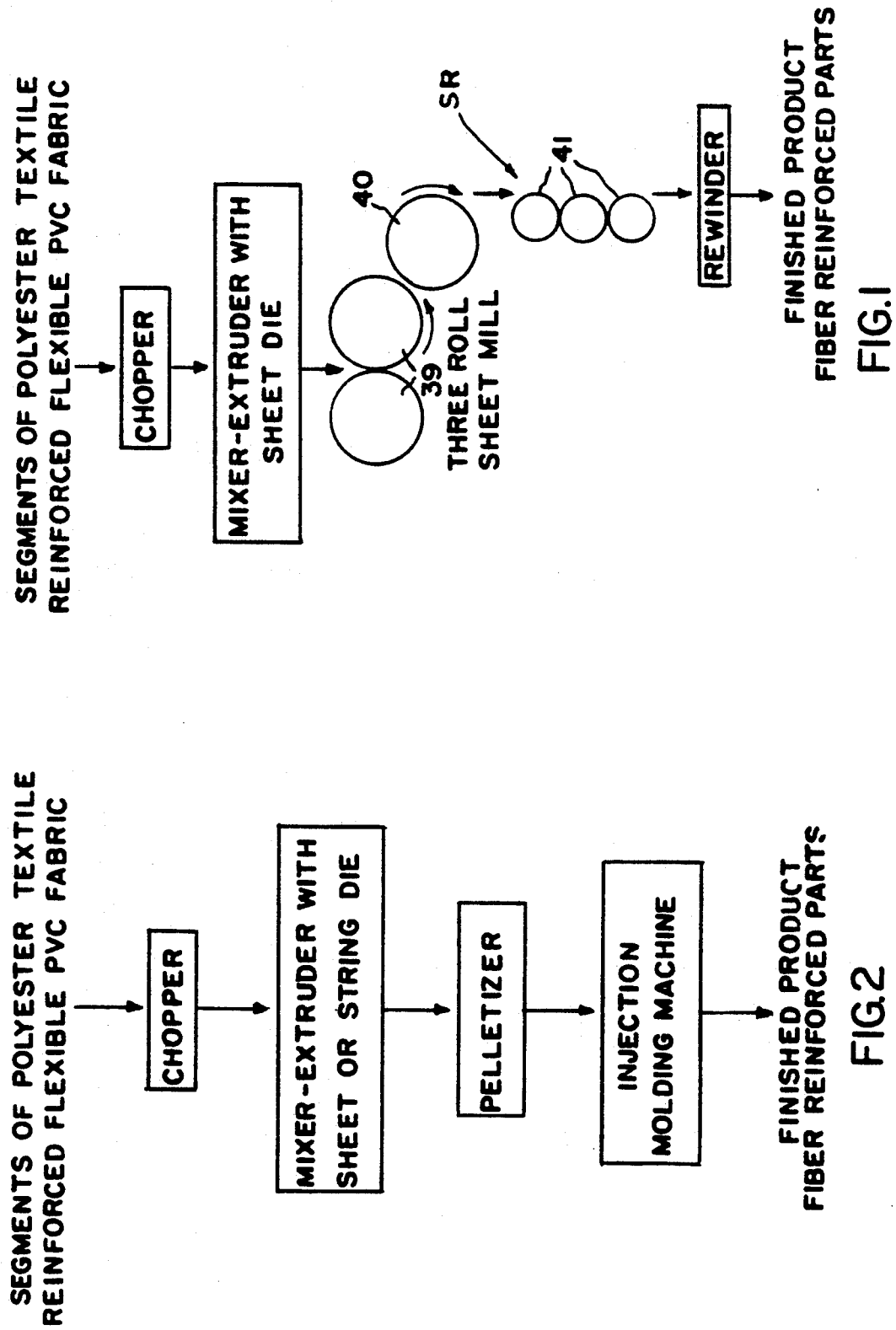

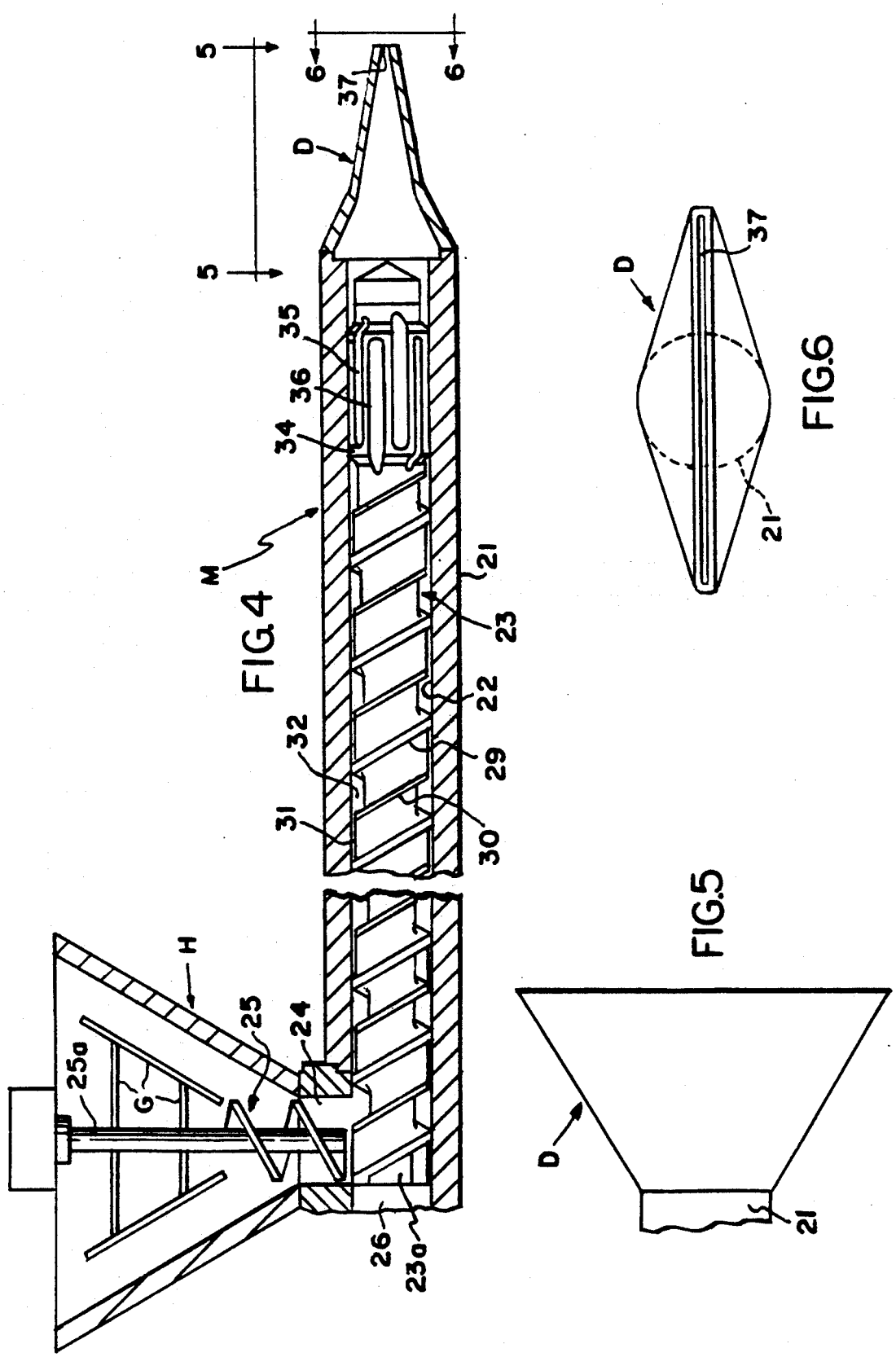

METHOD OF PROCESSING SCRAP ROOF-MEMBRANE SHEET MATERIAL COMPRISING A FLEXIBLE SYNTHETIC FABRIC SUBSTRATE ENVELOPED IN A THERMOPLASTIC PLASTIC ENVELOPE

BACKGROUND OF THE INVENTION

This invention relates to the recycling of scraps of single-ply synthetic plastic roof membranes of the type which are heat-seamable to form a one piece roof covering sized to fit the particular roof being covered. Such roofing membranes have found wide use in covering existing roofs as well as use in original roofs. Typically, the roof membranes are cut to size in a factory using measurements obtained at the building site and are then shipped to the building site in the form of elongate strips wound on rolls. At the building site, the edges of adjacent strips are seam welded to one another in a progressive manner and anchored to the roof deck. A considerable amount of scrap is generated at the factory during the cutting process to provide strips which will fit the roof deck being covered. While typically such scrap has been shipped to landfills for disposal, this method of disposing of the material has become ever more expensive and is not a satisfactory long term solution. There have been various proposals to recycle synthetic plastic material and the present applicant is aware of the following listed prior art patents:

| | | | |
|---|---|---|---|
| 4,546,128 | Nakajima | 2,558,378 | Petry |
| 4,105,598 | Stavrinou | 3,531,562 | Serrano et al |
| 4,158,646 | Benkowski et al | 3,535,408 | Ronden |
| 4,250,222 | Mavel et al | 3,562,373 | Logrippo |
| 4,617,111 | Grimm et al | 3,806,562 | Lamort et al |
| 4,726,846 | Jackson et al | | |

Of the foregoing, U.S. Pat. No. 4,158,646 seeks to reclaim or reprocess thermoplastic sheet material with textile reinforcement. In this process the chopped scrap is delivered to a so-called cold mill wherein the gap is set to reduce the fiber to a minute size having lengths no greater than 0.250 inches so that the mixture can be calendered. The process requires low temperatures in the Banbury or other mill in order to achieve optimum rupturing and tearing of the fibers. While other fibers, including glass fibers and polyester fibers are mentioned in U.S. Pat. No. 4,158,646, the process was apparently concerned with vinyl coated cotton knit fabric. It is not believed that the process taught would be suitable for applicant's assignee's vinyl-enveloped polyester fabric and would not produce the tough, durable and extremely strong product which applicant's improved process produces.

In U.S. Pat. No. 4,546,128 chopped and crushed waste polyester or polyamide fibers, generated from sources such as sewing factories were admixed with virgin polypropylene resin to provide inexpensive composite materials and the process is clearly different than the process for treating roof membrane material which will be described.

The present applicant's assignee has also recycled some of the roofing material by cutting the material into small pieces, placing the pieces in a heated compression mold, and pressing the heated pieces together in a plastic state to form a pad which, upon cooling, is useful as a walk pad.

SUMMARY OF THE INVENTION

In accordance with the present invention, a process is provided for processing material of the character defined to render it suitable for future use as an extruded product or a product which can be pelletized upon extrusion and then molded in injection molding or other molding processes. In practicing the process, the scrap roof membrane material is first comminuted to small pieces on the order of one-half an inch to an inch and a half in width and length dimension, after which the comminuted material is stuffed into a heat applying, continuous mixer-extruder having a screw mechanism within an elongate barrel chamber. The material is heated to a plasticizing temperature in the barrel and subjected to shear forces which disembody the composite warp and weft strands of the fabric when the material is sufficiently liquid. When the thermoplastic polyvinyl chloride (PVC) envelope is sufficiently liquid to flow and the immediate PVC coating on the warp and weft strands, and the PVC material in the openings between them, are liquid, the strands are separated by the disembodying forces of a substantial nature which are applied. At this time, the polyester strands are softened by the heat application to facilitate the discrete separation of the fibers constituting the strands. Care is taken not to heat the thermoplastic polyvinyl chloride to temperatures beyond liquifying temperature which would deteriorate or burn the composition.

The prime object of the invention is to provide an improved method of reprocessing scrap generated during the manufacture of single ply-roofing membranes, and eliminate the need for its disposal as a waste product.

Another object of the invention is to reprocess the scrap in a manner to produce a tough material having a strength which makes it suitable for many purposes to form a multitude of commercial products. For example, it is anticipated that the material extruded in sheet form will be useful as roof pads of the type used to provide pathways for workers applying membrane material to roofs, as truck mud flaps and truck floor liners, and as conveyor belting for farm machinery and the like. It is also anticipated that such material which is pelletized and later injected molded, for instance, will find use in roof vents, for example.

Other objects and advantages of the invention will be pointed out specifically, or will become apparent from the following description, when it is considered in conjunction with the appended claims and the accompanying drawings.

DESCRIPTION OF THE DRAWINGS

In the drawings, FIG. 1 is a block diagram schematically depicting the steps employed in a process which produces recycled sheet material.

FIG. 2 is a similar block diagram identifying the process used when the material is to be pelletized and then fed to an injection molding machine to produce a finished product from recycled material.

FIG. 4 is a fragmentary, schematic sectional view illustrating a mixer-extruder which may be used in the practice of the invention.

FIG. 5 is an enlarged fragmentary top plan view of the discharge end of the mixer-extruder.

FIG. 6 is an enlarged fragmentary, end view thereof;

DETAILED DESCRIPTION OF THE INVENTION

Figure 8:
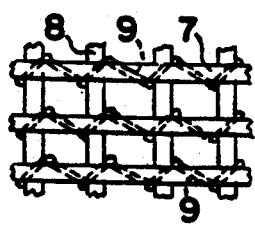
FIG. 8 is an enlarged, fragmentary, top plan view of the fabric only.
Figure 7:
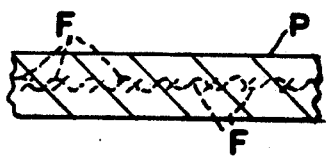
FIG. 7 is an enlarged, fragmentary, schematic transverse sectional view of the roof membrane material.

As FIGS. 1 and 2 particularly indicate, the scraps of polyester tricot fabric encased in a polyvinyl chloride envelope are first fed to a chopper which has a screen size with a mesh which discharges material in the one-half inch to one and one-half inch length and width range dimension, preferably in the one inch range dimension which is the, mesh screen used. As FIGS. 7 and 8 illustrate, the material which typically is in the range 20–85 mils in thickness, preferably 30–60 mils, comprises a perforate fabric strip generally designated F enveloped in a polyvinyl chloride envelope P. The strip F comprises polyester warp strands 7 laid across polyester weft strands 8. Polyester fiber or thread 9 of reduced diameter relating to the strands interweaves them, i.e. sews them together. The strands 7 and 8 each are made up of a number of fibers or filaments, i.e. 14 to 24 elongate fibers. In one form, 18 warp fibers are employed in each warp strand and 14 weft fibers in each weft strand.

Figure 3:
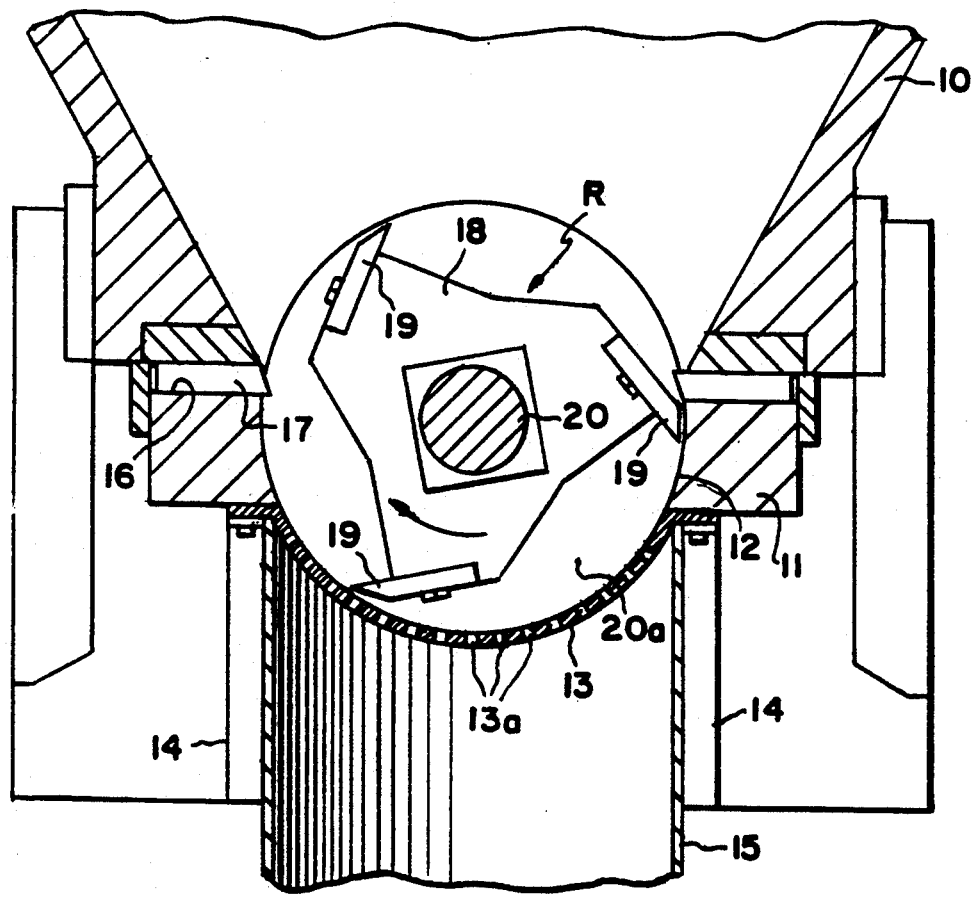
FIG. 3 is a fragmentary, sectional, elevational view illustrating a typical chopper which may be used to comminute the material.

A suitable chopper of the type manufactured by Wor-Tex Corporation of Hillsboro, Tex. is disclosed in FIG. 3 and comprises a supply hopper 10 feeding a housing part 11 provided with an elongate processing chamber 12. A screen 13, having openings 13a of the requisite size, i.e. one inch by one inch, can be removably supported by legs 14 and a suction discharge pipe 15 can be employed to draw the comminuted material through the screen opening. The housing 11, as usual, includes recesses 16 for bed or anvil knives 17. A rotor generally indicated at R comprises a blade supporting member 18 mounting fly knives 19 which in the usual manner cooperate with the bed knives 17 to chop the material to the desired size fragments. Rotor R is supported for rotation on a shaft 20 and end walls or discs 20a are provided at each end of chamber 12. Granulators of this type, which are of scissors-cutting style are believed also available from other sources. The material received in discharge pipe 15 is fed to a bin for storage, or may be fed directly to the mixer-extruder generally designated M which is shown schematically in FIGS. 4–6.

The mixer-extruder illustrated may be of the commercial variety manufactured by HPM Corporation of Mt. Gilead, Ohio. Such mechanisms include heated barrels 21 providing interior mixing and extruding chambers 22 within which a so-called double wave mixing and extruding screw, generally designated 23 and having a shaft 23a of uniformly gradually increasing diameter is received for rotation. At a charge end of the machine an inlet 24 is provided to supply material from a hopper generally designated H via a tapered stuffing screw 25. A material debridging gate G is also provided on the screw shaft 25a. The screw generally designated 23 is of the type disclosed in U.S. Pat. No. 4,173,417 which I incorporate herein by reference and is driven at an appropriate speed in a direction of rotation to move material from the charge end of the machine to the discharge end of the machine. Various screw configurations, as disclosed in U.S. Pat. No. 4,173,417, may be employed. A suitable electric or hydraulic motor or other drive is coupled to the screw 23 via a gear box 26. The same, or another, electric or hydraulic motor can be used to drive the shaft portion 25a of hopper screw 25.

The screw 23 will convey the material while it is being heated in the chamber 22 to the plasticizing or melting temperature of the polyvinyl chloride which is in the range 250°–380° F. may be specified as in the neighborhood of 350° F. to separate and disembody the strands 7–9 and disperse the separated filaments in the molten PVC material, and to extrude the mixed material. The barrel temperature at the charge end of the machine is maintained at 350° F. and this temperature is maintained throughout the barrel. Because of heat energy created by compression, the material may exit at around 370° F. Care is taken to control this temperature as the material proceeds from one end of the chamber 22 to the other. The material is not raised materially above this temperature to the point where the polyvinyl chloride would be burned or experience thermal degradation due to an overheat condition, or to the point where the polyester material would degrade. The melting of the polyvinyl chloride is sufficiently thorough to liquify the coating of polyvinyl chloride immediately adjacent the strands of polyester material and also that PVC material which has penetrated the pores or openings between the warp and weft strands of PVC material. This interaction tends to expose the warp and weft strands to disembodying shear forces in a manner which will be described. The temperature also softens the non-sized polyester strands 7 and 8 and thread 9, and renders them more readily separable.

The interwoven warp and weft strands 7 and 8 and the thread 9 are made up of untwisted, uniaxially stretched, polyethylene terephthalate (PET) plastic filaments. The filaments are uncontaminated for practical purposes because they have substantially remained encased in the envelope material. The polyvinyl chloride (PVC) envelope P may be formed of any one of the dry-blended calendered compounds used to produce PVC film. Such resins have average molecular weights in the 64,000 range and the film material to be laminated to sandwich the fabric is available from Canadian General Tower Ltd. of Cambridge, Ontario. Normally the vinyl chloride polymer includes a suitable plasticizer and may also include certain other additives to protect the product and render it fire-retardent and resistant to weather and sunlight. Other patents known to applicant which disclose PVC compositions are U.S. Pat. Nos. 4,515,744, 4,666,761 and 4,185,133, all of which are incorporated herein by reference for the purpose of illustrating that polyvinyl chloride coated fabrics are well known, and for any other purposes necessary. The fabric constitutes about 20–30% weight of the membrane product and the strands 7 and 8 are of 840 and 1000 denier respectively. The strands 7 and 8 each are made up of so-called high tenacity, but non-brittle, filaments. Typically, the average filament count may be 192. Because these fibers are stretched axially they have an advanced crystallization which enhances their strength reinforcing capability. The stitch thread 9 is typically about 70 denier and has an average filament count of 34. While polyester filaments have been specified, it is thought that other similar fibers such as polyamide or aramids may be employed.

It is understood that the processing barrel 21 is jacketed or otherwise heated to very rapidly raise the material admitted to the chamber 22 from ambient to melt temperature. The more open portion of screw 23 at the charge end conveys the material forwardly during this heating process without subjecting the material in a cold state to forces which would tend to produce fuzz balls because the material is in a relatively cold state. The material is continually subjected to repetitive rubbing or shear forces by the progressively compressing, double wave screw 23 which has helical flights 29 and 30 providing adjacent helical channel regions 31 and 32 of gradually decreasing radial extent over the length of screw 23, wherein the shear rate is high and low respectively. The rubbing takes place between the screw and barrel in the small clearances and between the strands 7-9 themselves. The fibers do not tend to rupture and the great majority of fibers or filaments retain their length in the one-half to one and one-half inch range. Most are substantially one inch in length. The flight 30 constitutes an undercut barrier flight between alternating waves in the twin channels and alternately exposes the mix to high shear rates for short times, and then redistributes the layers by decompression into the deep low shear regions. As in the U.S. Pat. No. 4,173,417 cited, a wave crest in one channel 31 lies next to a valley portion in the other channel 32. The alternating high and low shear regions enhance the strand separating action because the solid strands 7-9 tend to collect or be trapped temporarily in the high shear regions while the melt migrates to the zones of low shear. The disembodying strands 7-9 release from each region 31 to the adjacent region 32 after traveling half way around the screw. The melt material has a relatively short residence time in the zones of high shear rate and a relatively long residence time in the zones of low shear rate 32, but the overall rate of movement is relatively rapid, with the double wave screw 23, with continuously decreasing volume twin channels 31 and 32, keeping the barrel completely full of material under compression throughout. The longer residence time of the strands 7-9 in the high shear zones, where the PVC resin is progressively removed as a melt from the interstices between strands 7 and 8 and the thread 9 is disengaged, frees up the strands 7 and 8 from the weave. Thence, further residence time in subsequent high shear regions tends to disembody the strands 7-9 and separate them into their component filaments without fracturing or injuring the filaments. In the high shear regions, the strands 7-9 trap one another, and are rubbed against one another and against the screw and barrel walls (particularly at the wave crests) to achieve the separation of the filaments forming strands 7-9.

At its discharge end, the screw 23 incorporates a commercially available mixing section to achieve a final dispersion of the freed fibers. The mixer section comprises a shaft-mounted sleeve 34 which has recesses 35 and 36 extending alternately axially from its opposite ends which terminate short of the ends of sleeve 34. In the mixing section the separated discrete fibers or filaments traveling between passages 35 and 36 are further randomly homogeneously intermixed in the material immediately prior to the time the material enters discharge die D.

Figure 9:
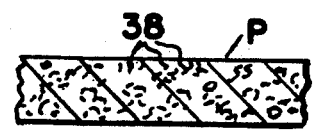
FIG. 9 is an enlarged, fragmentary schematic transverse sectional view of the product extruded.

As shown, the discharge die D provided with the HPM machine tapers to a wide slit 37 from which the material is extruded then in sheet form with dispersed fibers 38. Typically, the barrel chamber may be 4½ inches in diameter and the barrel may be eight feet long. As FIG. 1 indicates, it can then proceed to a sheet cooling mill generally designated SR through which it proceeds before being finally wound in coil form as a fiber-reinforced finished product. Mill SR can comprise calendering rolls 39, an embossing roll 40, and cooling rolls 41. The material can be effectively extruded in sheet thicknesses in the range 3/16 to ¼ of an inch, and is typically compressed in rolls, SR to ⅛ of an inch. It may have a width in the neighborhood of 72 inches and typically will comprise 10% to 25% polyester fibers by weight. The material is tough and the random polyester fibers 38 are so homogeneously dispersed (see FIG. 9) that it has a substantially uniform cross and lengthwise tensile strength which is enhanced over the original material. It further, while bendable but somewhat stiff, has a "memory" which returns it to linear sheet form and its bending strength is increased over the original material.

When the extruded material is not to be extruded in sheet form, a die having a single opening or multiple openings may be provided to extrude the material in a strand or strands. When a single strand or string is extruded, the material passes to cooling rolls and thence into a pelletizer for chopping it into pellet-size lengths. Such pellet-size lengths can be stored and then used for the injection molding of various finished products.

Although preferred embodiments of the invention have been illustrated in the accompanying drawings and described in the foregoing detailed description, it will be understood that the invention is not limited to the embodiments disclosed, but is capable of numerous arrangements, modifications and substitutions of parts and elements without departing from the spirit of the invention which is defined in the following claims.

What is claimed is:

1. In a method of processing scrap, roof-membrane, sheet material of a thickness in the general range of 30 to 60 miles and comprising a perforate, flexible, fabric having warp and weft strands with openings between strands, the strands being composed of bundles of elongate, synthetic plastic fibers, and the fabric being encased in a flexible polyvinyl chloride resin envelope, with the envelope material extending through the openings and coating the strands, the steps of:
   a. comminuting the sheet material to pieces substantially in the range of ½ to 1½ inch pieces in width and length dimension;
   b. without further comminuting the material, stuffing the comminuted pieces into a heat applying, continuous mixer-extruder having screw mechanism within an elongate barrel chamber for receiving the pieces, and advancing them continuously while progressively compressing them;
   c. heating the pieces to the plasticizing temperature of the envelope material while maintaining the temperature well below the melting temperature of the fibers and a temperature which would deteriorate the envelope material, and subjecting the fabric to repetitive high shear and low shear forces as the fabric immersed in the melting viscous, liquid, polyvinyl chloride resin moves along the barrel chamber as a mix of material to a die discharge;
   d. maintaining the barrel chamber full of the melted envelope material and fabric while applying said progressive compressive forces thereto;
   e. separating the immersed warp strands from the immersed weft strands via said shear force application while substantially maintaining the lengths of the strands in said range;

f. disembodying warp and weft strands via said shear forces to separate immersed fibers in such strands while substantially maintaining the lengths of the fibers in said range and provide separated fibers in the mix of material;

g. randomly dispersing said fibers in the mix of material; and h. extruding and cooling said material to solidify it in a form in which said discrete separated fibers are randomly dispersed in a polyvinyl chloride matrix.

2. The method of claim 1 wherein said strands are polyester strands having on the order of 14-24 fibers in a strand.

3. The method of claim 2 wherein said strands are made up of polyethylene terephthalate plastic filaments.

4. The method of claim 2 wherein said strands are generally in the range 840 to 1000 denier.

5. The method of claim 1 wherein said fibers comprise 10-25% of the material by weight.

6. The method of claim 1 wherein the extrusion is in sheet form.

7. The method of claim 6 wherein the extruded sheet has a thickness in the range of ⅛ to ¼ inches.

8. The method of claim 7 wherein the extruded sheet has generally the same tensile strength lengthwise and widthwise.

9. The method of claim 8 wherein the extruded sheet is only semi-flexible and has a memory returning it to flat sheet configuration upon bending.

10. The method of claim 1 wherein when said material is heated sufficiently to liquify the envelope material coated on said strands, the strands are softened sufficiently to permit the fibers forming them to be more readily separated one from the other when screw shear forces are applied.

11. The method of claim 10 wherein the material is heated to a temperature of about 350° C.

12. The method of claim 1 wherein said fibers are about less than 30% by volume in the material extruded.

13. The method of claim 1 wherein said extruded material is reduced to pellets.

14. The method of claim 1 wherein said thermoplastic material is a polymer or co-polymer of vinyl chloride.

15. In a method of processing scrap, single ply, fabric-enforced synthetic plastic sheet material comprising a perforate, flexible, fabric having warp and weft strands, the strands being composed of bundles of synthetic plastic, separable fibers, encased in a thermoplastic synthetic plastic envelope, with the envelope material coating the strands, the steps of:

a. comminuting the sheet material to small pieces above ⅛ of an inch in length and width substantially in the range of ½ to 1½ inches in length and width and in which the fabric remains substantially encased in the envelope and substantially protects said fabric from contamination;

b. stuffing the pieces so comminuted into a heat-applying, continuous mixer-extruder having screw mechanism within an elongate barrel chamber for receiving the pieces, melting the envelope material, and advancing the fabric and melted envelope material continuously as a material mix to a die discharge;

c. heating the material to the plasticizing temperature of the envelope material at a temperature well below the melting temperature of the fibers and the heat deterioration temperature of the envelope material, and subjecting the fabric to repetitive shear forces as it moves along the barrel chamber with the melted envelope material to said die discharge;

d. separating warp strands from the weft strands via said shear force application while substantially maintaining the lengths of the strands in said range;

e. disembodying warp and weft strands via said shear forces while substantially maintaining the lengths of the fibers in said range to provide separated fibers in the mix of materials;

f. randomly dispersing said fibers throughout the mix of material; and g. extruding and cooling said material to solidify it in a form in which said fibers are randomly dispersed in a thermoplastic synthetic plastic matrix.

16. The method of claim 15 in which said extruded material is cut into pellets following its extrusion.

17. The method of claim 15 wherein the material supplied to said barrel is continuously moved through a chamber volume which progressively decreases from its charge to the barrel to its discharge therefrom.

18. The method of claim 15 wherein the material supplied to said barrel is fed through alternating high and low shear regions, and the fabric concentrates temporarily in the high shear regions where it is subjected to disembodying shear forces before proceeding to low shear regions with the melted plastic material.

19. A method of processing laminate sheet material comprising a flexible fabric having warp and weft strands, the strands being composed of bundles of synthetic plastic, separable fibers, bonded by a polyvinyl chloride material coating the strands, the steps of:

a. comminuting the sheet material to small pieces substantially above ⅛ of an inch in length substantially in the range of ½ to 1½ inches in length;

b. stuffing the said pieces of such size into a heat applying, continuous mixer-extruder having screw mechanism within an elongate barrel chamber for receiving the pieces, melting the polyvinyl chloride material, and advancing the material continuously to a die discharge;

c. heating the material to the plasticizing temperature of the polyvinyl chloride material at a temperature well below the melting temperature of the fibers and the heat deterioration temperature of the polyvinyl chloride, and subjecting the fabric to repetitive shear forces as it moves along the barrel chamber with the melted polyvinyl chloride to said die discharge;

d. separating warp strands from the weft strands via said shear force application while substantially maintaining the lengths of the strands;

e. disembodying warp and weft strands via said shear forces while substantially maintaining the length of the fibers to provide separated fibers of the maintained length in the mix of material;

f. randomly dispersing said fibers throughout the mix of material; and g. extruding and cooling said material to solidify it in a form in which separated fibers are randomly disbursed in a polyvinyl chloride matrix.

* * * * *

UNITED STATES PATENT AND TRADEMARK OFFICE
CERTIFICATE OF CORRECTION

PATENT NO. : 5,145,617

DATED : September 8, 1992

INVENTOR(S) : Harry Hermanson, Robert C. Hultz and David R. Grussing

It is certified that error appears in the above-identified patent and that said Letters Patent is hereby corrected as shown below:

ON THE TITLE PAGE

Please substitute the following Abstract Of The Invention for the abstract originally filed:

ABSTRACT OF THE INVENTION

A method of processing scrap, single-ply synthetic plastic roof-membrane sheet material having a fabric, with warp and weft strands composed of bundles of synthetic plastic fibers, encased in a polyvinyl chloride plastic envelope. Comminuted pieces of the scrap are stuffed into a heat-applying, continuous mixer-extruder having screw mechanism within an elongate barrel chamber and the compressed material then is heated to plasticizing temperature and subjected to repetitive shear forces as it moves along the barrel chamber to a die discharge. The warp strands are separated from the weft strands via said shear force application without substantially reducing the lengths of the strands and strands are then disembodied via said shear forces without

UNITED STATES PATENT AND TRADEMARK OFFICE
CERTIFICATE OF CORRECTION

PATENT NO. : 5,145,617

DATED : September 8, 1992

INVENTOR(S) : Harry Hermanson, Robert C. Hultz and David R. Grussing

It is certified that error appears in the above-identified patent and that said Letters Patent is hereby corrected as shown below:

substantially reducing the lengths of the fibers to provide separated strand fibers in the mix of material. Finally, the fibers are randomly dispersed in the mix material and extruded.

In column 1, line 33, change "4,105,598" to -- 4,105,593 --.

In column 4, line 8, before "may" insert -- and --; line 54, before "weight" insert -- by --.

In column 6, line 36, change "miles" to -- mils --; line 58, change "melting" to -- melted --.

UNITED STATES PATENT AND TRADEMARK OFFICE
CERTIFICATE OF CORRECTION

PATENT NO. : 5,145,617

DATED : September 8, 1992

INVENTOR(S) : Harry Hermanson, Robert C. Hultz and David R. Grussing

It is certified that error appears in the above-identified patent and that said Letters Patent is hereby corrected as shown below:

In column 7, line 28, before "is" insert -- material --; line 37, change "350°C" to -- 350°F --; line 39, change "about" to -- of --; line 45, change "enforced" to -- reinforced --.

Signed and Sealed this

Thirty-first Day of August, 1993

Attest:

BRUCE LEHMAN

Attesting Officer

Commissioner of Patents and Trademarks